(12) United States Patent
Kubota et al.

(10) Patent No.: US 6,360,296 B1
(45) Date of Patent: Mar. 19, 2002

(54) DISK CONTROL APPARATUS

(75) Inventors: Hiromi Kubota; Hideaki Omura, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,946

(22) Filed: Mar. 31, 2000

(30) Foreign Application Priority Data

Mar. 31, 1999 (JP) ............................................ 11-091104

(51) Int. Cl.[7] .............................................. G06F 12/00
(52) U.S. Cl. ........................ 711/113; 711/136; 711/160
(58) Field of Search ................................ 711/113, 136, 711/114, 158, 160, 170, 209, 133, 159, 207

(56) References Cited

U.S. PATENT DOCUMENTS

| | | | | |
|---|---|---|---|---|
| 4,506,323 A | * | 3/1985 | Pusic et al. ................. | 364/200 |
| 4,523,206 A | * | 6/1985 | Sasscer ....................... | 364/200 |
| 4,875,155 A | * | 10/1989 | Iskiyan et al. .............. | 364/200 |
| 5,526,511 A | * | 6/1996 | Swenson et al. ........... | 395/461 |
| 5,542,066 A | * | 7/1996 | Mattson et al. ............. | 395/463 |
| 5,596,736 A | * | 1/1997 | Kerns ......................... | 395/404 |
| 5,627,990 A | * | 5/1997 | Cord et al. ................. | 395/449 |
| 6,192,450 B1 | * | 2/2001 | Bauman et al. ............ | 711/135 |

FOREIGN PATENT DOCUMENTS

JP      10240450 A   *   9/1998      ......... G06F/003/06

OTHER PUBLICATIONS

Alonso et al., "A new destage algorithm for disk cache: DOME", IEEE Proceedings 25th Euromicro Conference, 1999, vol. 1, pp 416–423. Sep. 1999.*

Varma et al., "Destage Algorithms doe Disk Arrays with Non–Volatile Caches", IEEE Proceedings, 22nd Annual International Symposium on Computer Architecture, 1995. pp 83–95, Jun. 1995.*

* cited by examiner

*Primary Examiner*—Matthew Kim
*Assistant Examiner*—Stephen Elmore
(74) *Attorney, Agent, or Firm*—Greer, Burns & Crain, Ltd.

(57) ABSTRACT

File control apparatus adapted to be operatively connected to a host device for controlling a plurality of memory devices includes a cache memory for storing data blocks sent to or retrieved from the at least one memory device by the host. A control unit controls data transfer between the memory devices and the cache memory. A continuous data information generating device is included for generating continuous data information indicating whether the data blocks from the same memory device are updated continuously The control unit stores the continuously updated data blocks from the same memory device back to that same memory device as a single data block in accordance with a least recently used (LRU) scheme.

15 Claims, 10 Drawing Sheets

Fig. 5A

| ENTRY No. | PHYSICAL DEVICE No. | LOGICAL DEVICE No. | BLOCK No. | FRONT | REAR |
|---|---|---|---|---|---|
| 0 | 1 | 1-1 | C | 1 | * |
| 1 | 1 | 1-2 | E | 3 | 0 |
| 2 | 2 | 2-1 | F | * | 3 |
| 3 | 2 | 2-2 | D | 2 | 1 |

Fig. 5B

| ENTRY No. | PHYSICAL DEVICE No. | LOGICAL DEVICE No. | BLOCK No. | FRONT | REAR |
|---|---|---|---|---|---|
| 0 | 1 | 1-1 | C | * | 2 |
| 1 | 1 | 1-2 | E | 3 | * |
| 2 | 2 | 2-1 | F | 0 | 3 |
| 3 | 2 | 2-2 | D | 2 | 1 |

Fig. 7A

| ENTRY No. | PHYSICAL DEVICE No. | LOGICAL DEVICE No. | BLOCK No. | FRONT | REAR |
|---|---|---|---|---|---|
| 0 | 3 | 3-1 | D | * | 1 |
| 1 | 2 | 2-2 | F | 1 | * |

Fig. 7B

| ENTRY No. | PHYSICAL DEVICE No. | LOGICAL DEVICE No. | BLOCK No. | FRONT | REAR |
|---|---|---|---|---|---|
| 0 | 3 | 3-1 | D | 2 | 1 |
| 1 | 2 | 2-1 | F | 0 | * |
| 2 | 1 | 1-1 | A | 3 | 0 |
| 3 | 1 | 1-1 | B | 4 | 2 |
| 4 | 1 | 1-1 | C | * | 3 |

Fig. 7C

| ENTRY No. | PHYSICAL DEVICE No. | LOGICAL DEVICE No. | BLOCK No. | FRONT | REAR |
|---|---|---|---|---|---|
| 0 | 1 | 1-1 | A | 1 | * |
| 1 | 1 | 1-1 | B | 2 | 0 |
| 2 | 1 | 1-1 | C | * | 1 | ns system, and more particularly, to a file control

DISK CONTROL APPARATUS

The present invention relates to a file control apparatus for controlling an external memory device in an information processing system, and more particularly, to a file control apparatus for controlling destaging of data from a cache memory to a plurality of disk type memory devices.

BACKGROUND OF THE INVENTION

Known file control apparatus are generally provided with a disk cache memory which enables a plurality of simultaneous accesses to the same data to increase access performance. The cache memory is usually composed of a semiconductor memory element, which allows for acceptance of a plurality of accesses for data stored in the cache memory. Time spent waiting for positioning of the actuator arm of a magnetic disk or the like is not required when data is stored in the cache memory. As a result, waiting time for the start of data transfer is also eliminated. For these reasons, file control apparatus employing a cache memory have extraordinarily high speed response characteristics.

A conventional memory apparatus 20 is shown in FIG. 10, and includes a file control apparatus 30 and three physical memory devices 21 (indicated separately as 21-1, 21-2 and 21-3). Each physical memory device 21 is provided, for example, with two logical memory devices 50 (indicated separately as 50-1 and 50-2). Also included is a pair of server interface modules (SIFM) 33-1, 33-2, three device interface modules (DIFM) 34-1, 34-2, 34-3, and two access paths 35-1, 35-2 to a cache memory 40. A control unit 31 is also provided in the file control apparatus 30 and includes a memory control 41. Information regarding data in the cache memory 40 is arranged in a cache memory management table 42 in the memory control 41, and indicates the correspondence between the position of data blocks in the physical or logical memory device 21 or 50 in which the relevant data is recorded and the position in the cache memory 40 storing a copy of that data.

A conventional cache memory management table 42 is shown in FIG. 11, and includes block units of data priority information used for management of the cache memory 40. Each block unit represents data stored in the memory devices 50. The data priority information has a format, for example, where the entries (60-x) of the blocks are arranged according to priority.

The capacity of the disk cache memory 40 is smaller than that of the physical (or logical 50) memory devices 21 connected to the file control apparatus 30. Therefore, data stored in the cache memory 40 must replaced as necessary. Replacement is realized by "ruling out" or "destaging" data stored in the cache memory 40 to the memory devices 21 (or 50) and "reading" or "staging" data from the memory devices 21 (or 50) into the cache memory.

For data replacement, least recently used (LRU) system is often used. The LRU system is a control system in which the lowest priority is given to the least recently accessed data and the highest priority is given to the most recently accessed data. Data having the lowest priority is ruled out from the cache memory 40 first. This system is illustrated with reference to the cache memory management table 42 shown in FIG. 11. The left most column shows the current state of the management table 42. If, for example, data of block E of a logical memory device 50-1 is newly stored in the cache memory 40, a new entry 60-1 corresponding to block E is added to the management table 42, as shown at the top of the middle column of the management table 42.

As a result, data of block A of the same logical memory device 50-1, which has the lowest priority, is ruled out from the cache memory 40, and the corresponding entry 60-2 (shown at the bottom of the left column) in the cache memory management table 42 is deleted from the management table. The middle column shows the condition of the management table after the data of block A of the logical memory device 50-1 has been ruled out or destaged.

Two kinds of processes are known for ruling-out data from the cache memory 40. The first process involves the file control apparatus 30 only logically invalidating the object data stored in the cache memory 40. The second process involves the file control apparatus 30 logically invalidating the object data stored in the cache memory 40 after storing the data in the memory devices 21 (or 50).

The first ruling-out or destaging process is performed when the contents of the data stored in the cache memory 40 match the contents of the data stored in the memory devices 21 (or 50). This can occur, for example, where the relevant data is never updated after it has been staged, or in the case where the data has been updated after being staged, update is not conducted after an execution of synchronization of data on the cache memory 40 and the corresponding data on the memory devices 21 (or 50). Synchronization of data on the cache memory 40 and the corresponding data on the memory device is typically periodically performed by the file control apparatus 30 and is a process for matching the contents of data on the cache memory 40 and that of the data on the memory device 21 (or 50). Such process is performed by storing the data updated in the cache memory 40 into the logical memory device 50.

The second destaging process is performed when the contents of data stored in the cache memory 40 are different from the contents of data stored in the memory devices 21 (or 50). This condition occurs, for example, when the data on the cache memory 40 is updated after a staging, and synchronization has not yet been performed.

Destaging is sometimes performed even when there is no shortage of empty areas in the cache memory 40. For example, the file control apparatus 30 sometimes periodically rules out the data from the cache memory 40 for improvement of performance of the memory apparatus 20 as a whole.

In another example of data staging and destaging using the LRU system, while referring to FIG. 9, data of block F of the logical memory device 50-2 is newly stored in the cache memory 40, and a new entry 60-3 corresponding to block F is added to the cache memory management table 42 (shown at the top of the right column). As a result, an entry 60-4 corresponding to the data of block B of the same logical memory device 50-2 (the bottom entry in the middle column) is ruled out from the cache memory management table 42 (see the right column), since it has the lowest priority.

As seen in the above examples, destaging is conventionally conducted without considering the position on the memory device 21 (or 50) to which to store the ruled out or destaged data. Therefore, storing of these data to a position in the memory device 21 (or 50) is done at random. As a memory device, a rotating type memory medium such as a magnetic disk device or an optical disk device is often used. Therefore, when accesses to the memory devices are conducted at random, positioning is required for each access, including storing ruled out or destaged data in the memory device. Therefore, much time and resources are consumed every time data is destaged. Destaging often becomes a reason for deterioration of the overall performance of the file control apparatus 30, because it competes with other usual operational accesses from a server or the like.

Accordingly, one object of the present invention is to provide an improved file control apparatus which prevents such deterioration of performance.

Another object of the present invention is to provide an improved apparatus for generating continuous data information indicating data blocks from the same memory device which are updated consecutively in a cache memory.

Yet another object of the present invention is to provide an improved apparatus which destages a plurality of consecutively updated data blocks from the same memory device as a single block.

SUMMARY OF THE INVENTION

In keeping with one aspect of this invention, a file control apparatus is adapted to be operatively connected to a host device for controlling external memory devices. The apparatus includes a cache memory for storing data blocks sent to or retrieved from the memory devices by the host device. A control unit controls data transfer between the memory device and the cache memory. A continuous data information generating feature is provided for generating continuous data information indicating whether data blocks from the same memory device are updated consecutively in the cache memory. The control unit stores the consecutively updated data blocks from the same memory device back to that memory device as a single data block.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which:

FIGS. 5A and 5B are contents of a data priority information table of the invention;

FIGS. 7A and 7B illustrate the status of data priority information during the continuous data information generating process described in FIG. 6;

FIG. 7C shows the status of a continuous data information table after the continuous data information generating process of FIG. 6.

DETAILED DESCRIPTION

Figure 1:
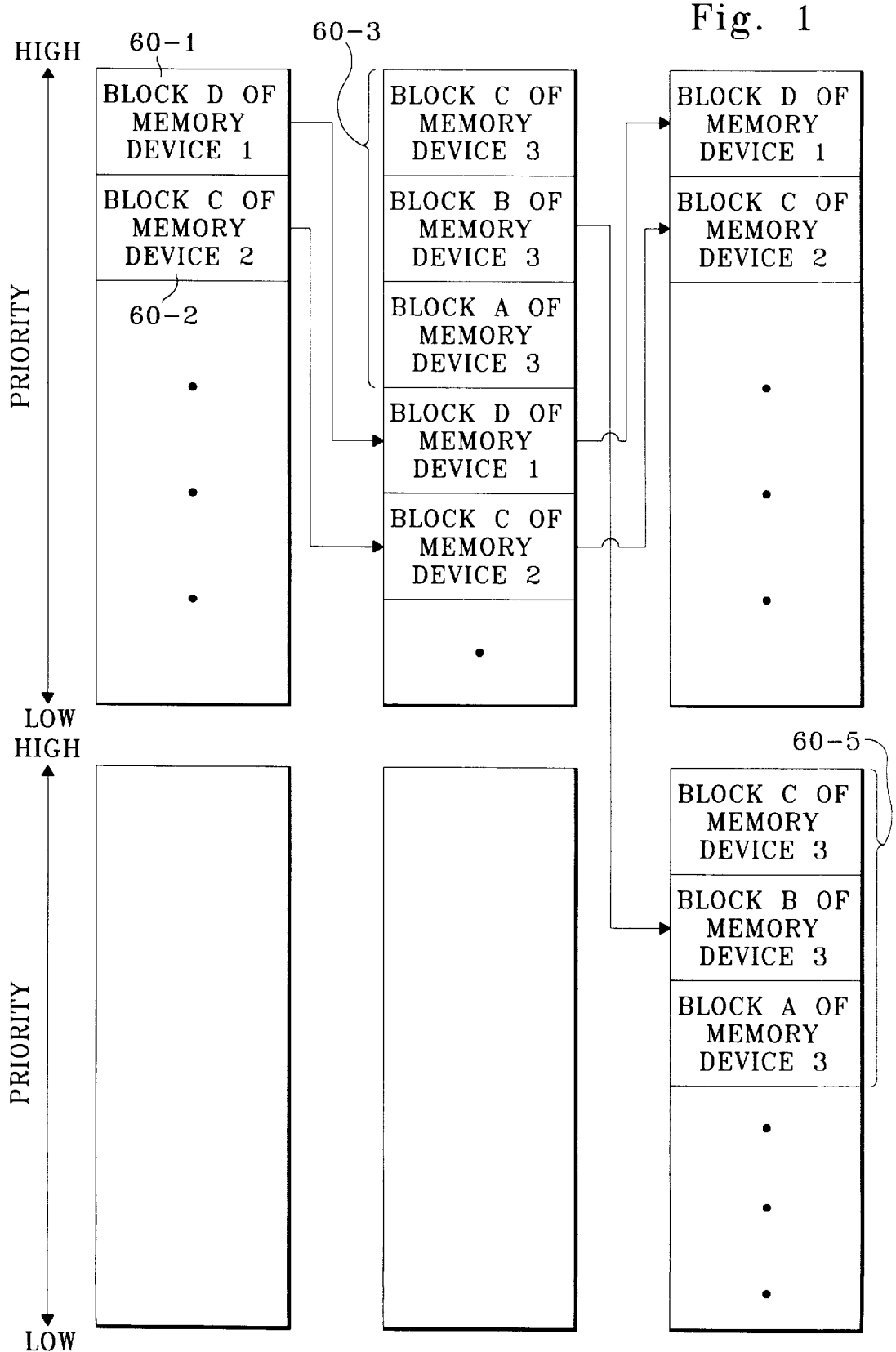
FIG. 1 is a diagram illustrating transition of data priority information and continuous data information during a data updating process in accordance with the present invention.

FIG. 1 illustrates the concept of a rule out or destaging process of the present invention. The upper three columns illustrate the transition of data priority information of a least recently used (LRU) system, while the lower three columns shows the transition of continuous data information, which indicates the data blocks from a particular physical or logical memory devices which are continuously or consecutively updated in a cache memory of the file control apparatus. The data priority information is assumed, for example, at the beginning, to be in the condition as shown in the upper left column. As shown, block D (entry 60-1) of, for example, a memory device 1 has the highest priority, followed by block C (entry 60-2) of, for example, a memory device 2. At this time no continuous data information is registered, as illustrated in the lower left column, since the two entries are not continuous from the same memory device. It should be noted that the memory devices 1 and 2 are being referenced generally and that they can be either physical or logical.

Under this condition, block A of a memory device 3 is updated. Subsequently, block B and block C of the memory device 3 are also updated (entry 60-3). At this time, the data priority information indicates, in the order of descending priority, block C, block B and block A of memory device 3, as shown in the upper center column. In this case also, no continuous data information is registered, as indicated in the lower center column.

As a result of the series of update processes described above, the priority of blocks D and C are lowered as much as the number of updates counted by the file control apparatus. The three updated blocks are stored in the cache memory of the file control apparatus.

In the above case, three blocks have been updated. Therefore, the file control apparatus can detect that the update process has started from the data having the previously highest priority, which is lowered by three levels from the data newly having the highest priority, as shown in the upper center column. The file control apparatus retrieves the data stored in the blocks from three levels from the block having the previous highest priority to the block now having the highest priority, i.e., block A, block B and block C, respectively.

When the updated blocks are continuous or consecutive, the file control apparatus arranges the data priority information again in the sequence of priority, except for the continuous data block. Thus, the condition before the continuous update processes had been performed, as shown in the upper left column, is recovered. This condition is illustrated in the upper right column. The continuous data blocks moved from the data priority information is registered as continuous data information (entry 60-5), as illustrated in the lower right column. In the case of the update process not detecting continuity, the object data is updated and is given the highest priority by the data priority information as in the related art. When destaging of data stored in the cache memory is requested, the file control apparatus refers to the continuous data information, and destages a series of continuous data blocks having the lowest priority level among other series of continuous data blocks, if any.

The present invention also includes information for indicating priority between the data blocks included in the data priority information and a series of continuous data blocks included in the continuous data information. The data block or the series of continuous data blocks having the lower priority is destaged during a rule-out process. Alternatively, uniform management of priority sequence may be realized by generating an entry for the continuous data blocks in the data priority information. In this case, after object data blocks are entered in the continuous data information, a pointer indicating the entry of continuous data information is added to the entry of the highest priority level of the data priority information.

When the continuous data information is in the condition illustrated in the lower right side of FIG. 1, for example, the file control apparatus conducts destaging of continuous blocks A through C of the same memory device 3. The file control apparatus is no longer required to conduct positioning for each data block because it can store a series of data indicated in the continuous data information to the memory device in a single destaging operation. Accordingly, the file control apparatus can perform destaging at a high speed with maximum efficiency.

Figure 2:
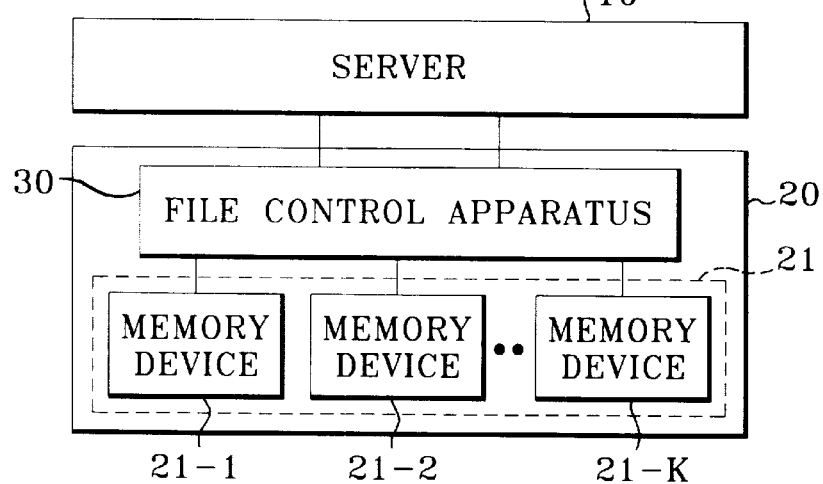
FIG. 2 is a block diagram of a system in which the present invention is implemented.

FIG. 2 illustrates a structure of a computer system of the present invention. The computer system includes a server 10 and a memory apparatus 20 for making data access. The memory apparatus 20 includes memory devices 21-1 to 21-k and a file control apparatus 30.

Upon issuance of a data read request from the server 10, the file control apparatus 30 reads the requested data from the object memory device 21 and then sends the data to the server 10. When a data write request is issued to the memory apparatus 20 from the server 10, the file control apparatus 30 writes the data to the object memory device 21. In FIG. 2, k units of the memory devices 21 are connected to the file control apparatus 30. When data write is instructed to the memory apparatus 20 from the server 10, the file control apparatus 30 selects the object memory device 21 to write the data.

Figure 3:
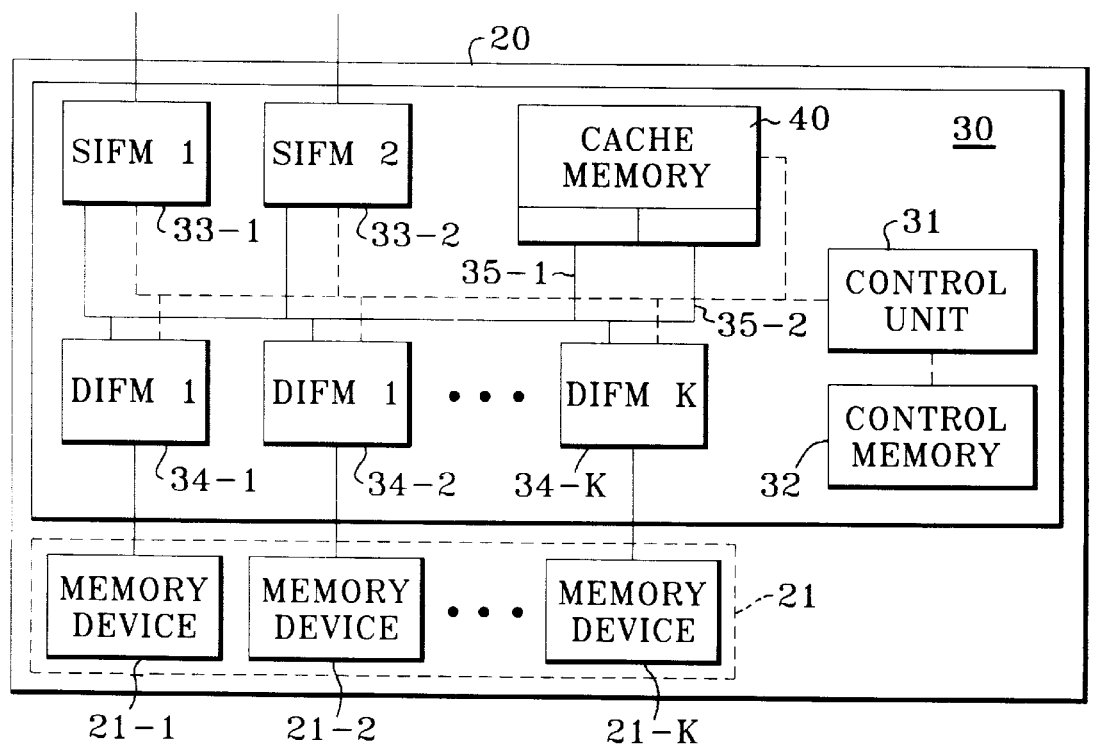
FIG. 3 is a block diagram of the file control apparatus of the present invention.

FIG. 3 is a diagram illustrating an example of the structure of the memory apparatus 20. The file control apparatus 30 comprises a control unit 31 for controlling the file control apparatus 30, a control memory 32 for recording the resource management condition to be controlled by the control unit 31, a plurality of server interface modules (SIFM) 33 for controlling the interface with the server 10 and a plurality of device interface module (DIFM) 34 for controlling interface with the memory devices 21. The file control apparatus 30 also comprises a cache memory 40 for storing data of the memory devices 21. The memory devices 21 can be magnetic disks or optical disks, for example.

When an access request is issued to the memory apparatus 20 from the server 10, the file control apparatus 30 first checks whether the object data is stored in the cache memory 40. When the object data is stored in the cache memory 40, such data is used for the access request from the server 10. When the object data is not stored in the cache memory 40, the following process is performed depending on the contents of the access request from the server 10.

When an access is made for data reading, the file control apparatus 30 reads the object data from the memory device 21 and then transfers it to the server 10. The file control apparatus 30 also stores the data read from the memory device 21 to the cache memory 40, and makes preparation for the next access. When access is made for data writing, the file control apparatus 30 writes the write data to the cache memory 40 from the server 10. The capacity of the cache memory 40 is less than the total memory capacity of the memory devices 21-1 to 21-k. Therefore, the file control apparatus 30 is often required to perform destaging of data in the cache memory 40.

Figure 4:
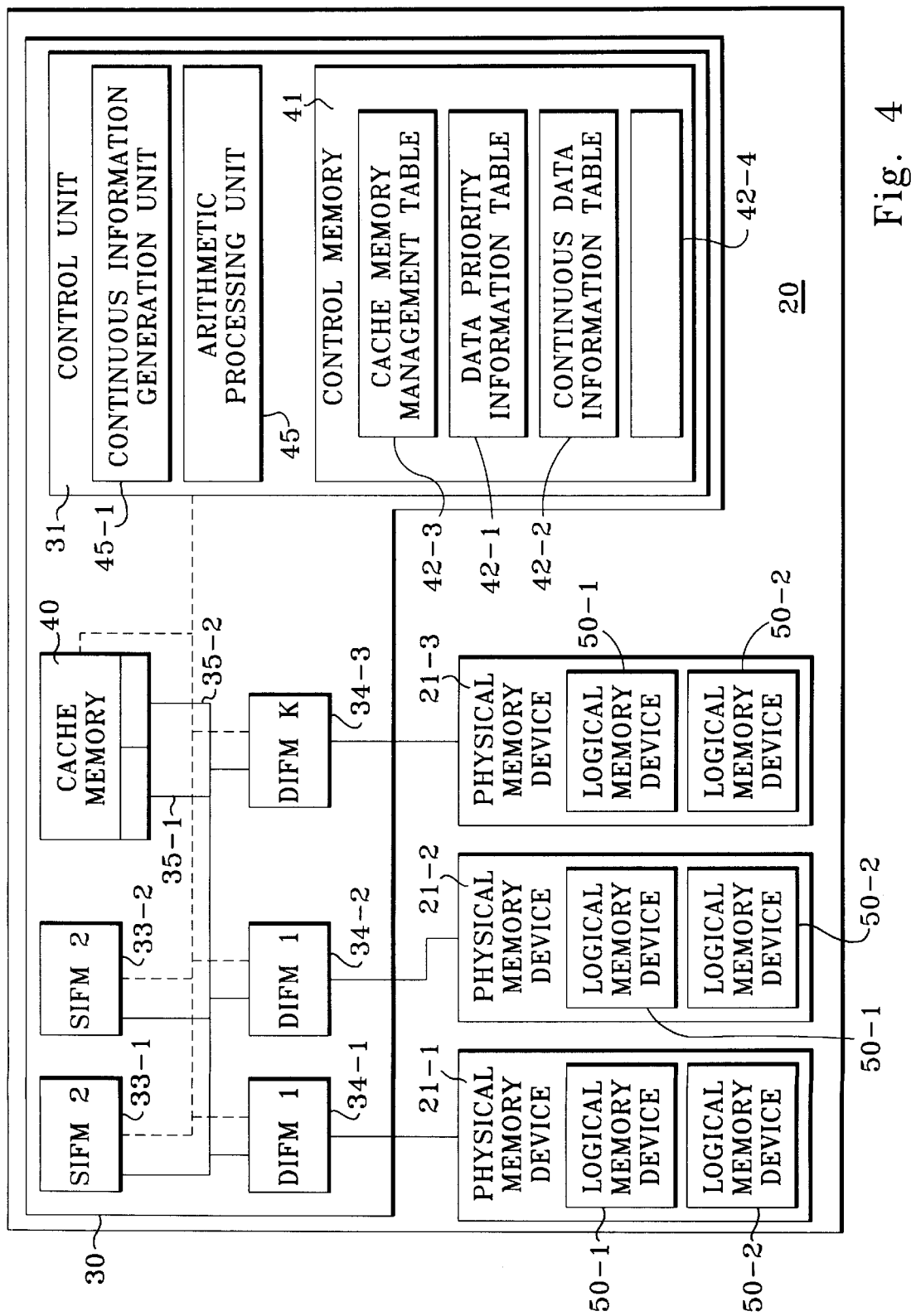
FIG. 4 is a more detailed block diagram of the file control apparatus of FIG. 3.
Figure 6:
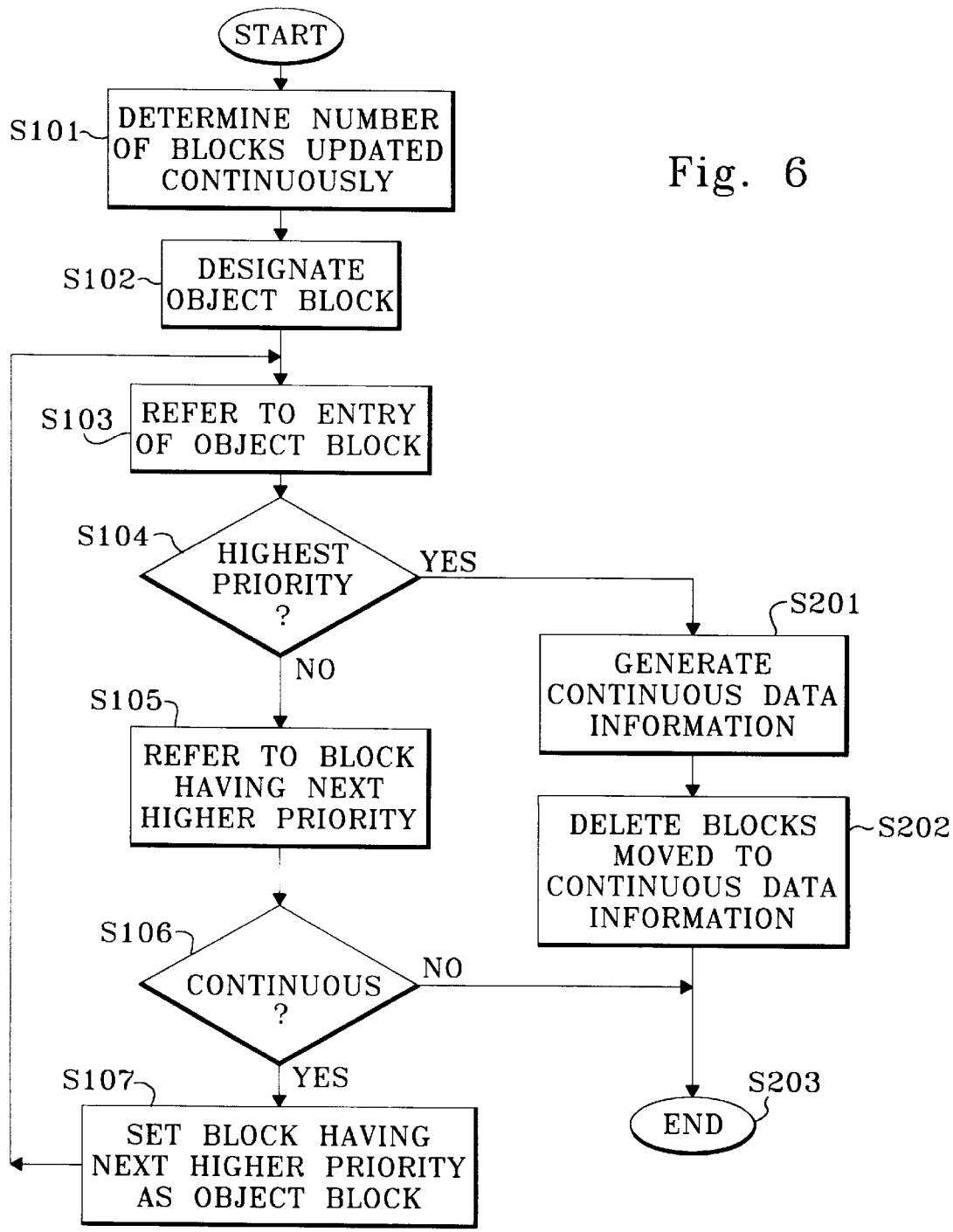
FIG. 6 is a flow chart explaining the process for generating continuous data information.

FIG. 4 illustrates an embodiment of the present invention. In this embodiment, two logical memory devices 50 (individually designated as 50-1 and 50-2) are formed in one physical memory device 21. Here, the memory apparatus 20 is assumed to comprise two SIFM 33-1, 33-2, three DIFM 34-1 to 34-3, three physical memory devices 21 (shown separately as 21-1, 21-2 and 21-3), and two access buses 35-1, 35-2 connected to the cache memory 40.

The control unit 31 of the file control apparatus 30 includes an arithmetic processing unit 45, a continuous information generating unit 45-1 and a control memory 41. The continuous information generating unit 45-1 determines whether data blocks on the cache memory 40 that are object of a series of continuous update processes requested from the server 10 are from the same memory device 21, and generates continuous data information which provides such information.

The control memory 41 is provided with a data priority information table 42-1, a continuous data information table 42-2, a cache memory management table 42-3 and a continuous counter 42-4 which keeps track of the number of blocks that are continuously updated from the same memory device 21. The arithmetic processing unit 45 operates in accordance with the program stored in the control memory 41 to control the file control apparatus 30.

FIGS. 5A and 5B are diagrams illustrating an example of the data priority information table 42-1. This table provides management priority between entries of data blocks in the cache memory 40. A data block is understood to mean a copy of a part of data stored in the memory device 21. In the table, each entry is given an "Entry Number" in the ascending sequence. Four entries are shown in FIGS. 5A and 5B as an example, indicating that four data blocks are stored in the cache memory 40.

A "physical device number" indicates the physical memory device 21 in which a data block is stored. A "logical device number" indicates the logical memory devices 50 in which the block is stored. Those of ordinary skill in the art will recognize that when the relationship between the physical memory device 21 and the logical memory device 50 is apparent, the "logical device number" is not essential information for the data priority information. However, in this embodiment, the data priority information indicates the relationship between the physical memory device 21 and the logical memory device 50.

In the condition illustrated in FIGS. 5A and 5B, it can be recognized by referring to entry 0 and entry 1 that the logical memory devices 1-1 and 1-2 are both formed in the physical memory device 1. Moreover, it can also be recognized by referring to entry 2 and entry 3 that the logical memory devices 2-1 and 2-2 are both formed in the physical memory device 2.

The "block number" indicates the data block stored in the cache memory 40. Under the condition illustrated in FIGS. 5A and 5B, entry 0, for example, provides information about block C stored in the logical memory device 1-1 formed in the physical memory device 1.

The "front" indicates the entry having a priority one level higher than that of the subject entry, while the "rear" indicates the entry having a priority one level lower than that of the subject relevant entry. A null value, which is indicated by an "*" in FIGS. 5A and 5B is set in the "front" of the entry having the highest priority level, and set in the "rear" of the entry having the lowest priority level.

In the example shown in FIG. 5A, the priority becomes lower in the sequence of block F of the logical memory device 2-1, block D of the logical memory device 2-2, block E of the logical memory device 1-2 and block C of the logical memory device 1-1.

When data requested to be read by the server 10 is stored in the cache memory 40, the file control apparatus 30 transfers the data from the cache memory 40 to the server. When the data requested to be read from the server 10 is not stored in the cache memory 40, the file control apparatus 30 reads and transfers the data from the physical memory device 21 (or the logical device 50) to the server.

When data requested to be written by the server 10 is stored in the cache memory 40, the file control apparatus 30 updates the data in the cache memory 40. However, when the data requested to be written by the server 10 is not stored in the cache memory 40, the file control apparatus 30 first reads the requested data from the memory device, whether physical 21 or logical 50, and then records this data to the cache memory 40. Thereafter, the file control apparatus 30 updates the data recorded in the cache memory 40 with the data transferred from the server 10.

Alternatively, the file control apparatus 30 can directly write the data requested to be written by the server 10 to the cache memory 40 without reading the data from the memory device 21 or 50. The data to be updated in the cache memory 40 is written back to the appropriate memory device 21 or 50, for example, when the block including such data is ruled out from the area on the cache memory.

The control unit 31 gives the highest priority to the entry in data priority information table 42-1 to which a read or write instruction is issued. For example, it is assumed that an access is executed to block C of the logical memory device 1-1 when the data priority information table 42-1 is initially in the condition illustrated in FIG. 5A. In this case, the control unit 31 gives the highest priority to entry 0 corresponding to block C of the logical memory device 1-1. Therefore, the control unit 31 sets the null value (*) in the "front" of entry 0 and also sets 2 to the "rear" thereof, since entry 2 had the highest priority before the current access was made to block C of the logical memory device 1-1. A zero is set to the "front" of entry 2. Entry 0 is now given the highest priority. Next, the control unit 31 sets the null value (*) to the "rear" of entry 1, giving it the lowest priority.

Thus, the update of the data priority information is completed. The table 42-1 embodying the updated apparatus priority information is illustrated in FIG. 5B. The updated priority level is determined to become lower in the sequence block C of the logical memory device 1-1, block F of the logical memory device 2-1, block D of the logical memory device 2-2 and block E of the logical memory device 1-2.

The table 42-2 embodying the continuous data information has the same format in this embodiment as the data priority information table 42-1. Therefore, contents and manipulations are the same as those of the date priority information table 42-1. However, this embodiment does not restrict the format of the continuous data information table. As the format of the continuous data information table, it is also possible to form a format, for example, to indicate the continuous data starting block and the ending block for each entry of a series of continuous data.

Next, a data update process will be explained below while referring to FIGS. 6 and 7A–7C. The data priority information table 42-1 is assumed initially to be in the condition illustrated in FIG. 7A. It is also assumed that no information is initially in the continuous data information table 42-2. Under this condition, data update is requested from the server 10 for three blocks. The relevant data blocks are updated in the sequence of block A of the physical memory device 1, block B of the physical memory device 1, block C of the physical memory device 1. The control unit 31 updates the data priority information table 42-1 for each issuance of the data update request from the server 10. When the update to three blocks A, B and C from the server 10 is completed, the priority information data table 42-1 is in the condition illustrated in FIG. 7B. The continuous counter 42-4 is set to 3.

The control unit 31 decides, when the series of update processes are completed, whether the relevant continuous update processes have been executed to the blocks from the same memory device (physical or logical). The control unit 31 determines the number of blocks updated continuously by referring to the continuous counter 42-4 (S101). The control means 31 then designates the first block of the continuous blocks registered by the update process as the object block (S102). In this example, block A of the physical memory device 1 having priority which is two levels from that of the block having the highest priority, i.e. block C of the physical device 1, becomes the object block.

Here, the control unit 31 refers to the entry of the object block (S103) and decides whether the object block has the highest priority (S104) from the data priority information table 42-1. If the relevant block does not have the highest priority, the control unit 31 refers to the block having the next higher priority (S105). The control unit 31 then decides whether the block having the next higher priority is continuous (i.e., from the same memory device 21 or 50) to the current object block (S106). If the blocks are not continuous, the process is completed upon the determination that the series of updated blocks are not from the same memory device 21 or 50 (S203). If the blocks are continuous, the next block having a priority one level higher becomes the object block (S107). The control means 31 refers to the entry of this new object block in the data priority information table 42-1 (S103) and repeats the above steps.

On the other hand, when the object block determined at step S103 has the highest priority, reference to the data priority information table 42-1 is completed. Moreover, the fact that tracing of entry up to the block having the highest priority has been realized indicates that all the object blocks have been continuous (i.e., that he blocks are from the same memory device 21 or 50. Therefore, the control unit 31 generates continuous data information in the continuous data information table 42-2 (S201).

Initially, no information is written in the continuous data information table 42-2. Therefore, only the blocks updated continuously this time are indicated in the continuous data information table 42-2. An example of the continuous data information table 42-2 in this condition is illustrated in FIG. 7C. The control unit 31 deletes the entries of the blocks moved to the continuous data information table 42-2 from the data priority information table 42-1 (S202). Therefore, the data priority information table 42-1 returns to the condition of FIG. 7A before the update processes.

Figure 8:
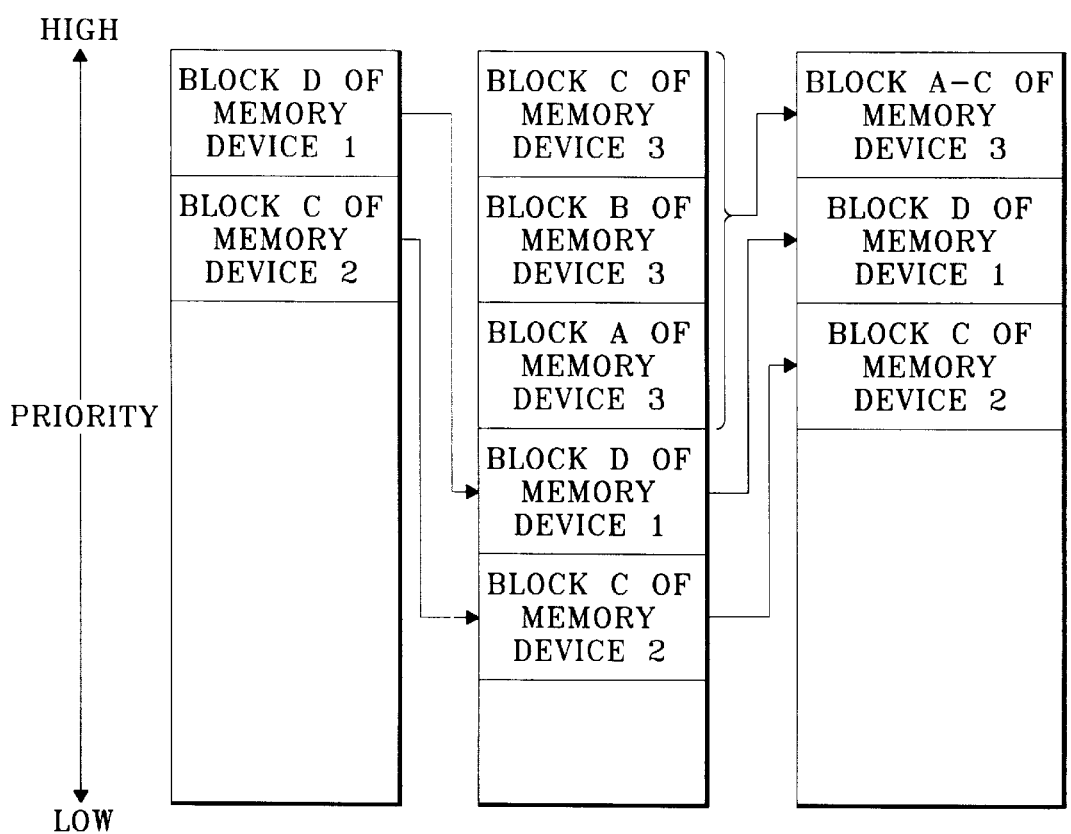
FIG. 8 is a diagram illustrating another embodiment of transition of data priority information and continuous data information during a data updating process in accordance with the present invention.

Referring now to FIG. 8 and in accordance with another embodiment of the present invention, continuous data information is maintained in the data priority information table 42-1, and not separately provided in the continuous data information table 42-2. FIG. 8 is similar to the example shown in FIG. 1, where the existing data priority information (the left column) is updated with data blocks A–C (the center column). In this embodiment, instead of registering continuous blocks A–C in the continuous data information table 42-2 as described above, a highest entry is made to the data priority information indicating the starting block number (block A) and the ending block number (block C) of the continuous data, as shown in the right column of FIG. 8.

In this embodiment, each block has a starting and ending block number. For a single data block, the starting and the ending blocks are the same. When destaging in necessary, the control unit 31 destages the block, whether continuous or not, having the lowest priority in the data priority information table 42-1.

Figure 9:
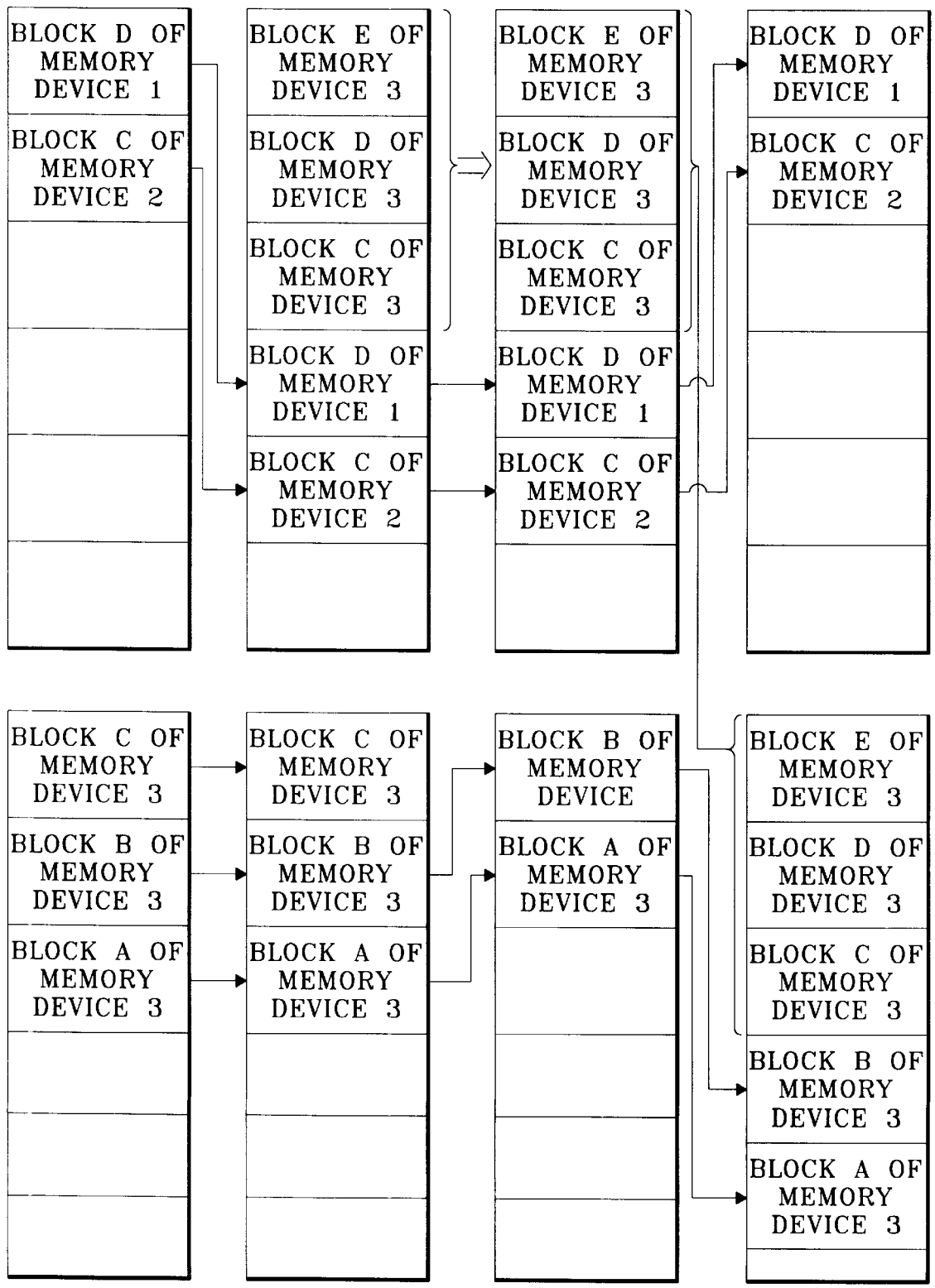
FIG. 9 is a diagram illustrating transition of data priority information and continuous data information during a data updating process when redundant continuous data information exists, in accordance with the present invention.
Figure 10:
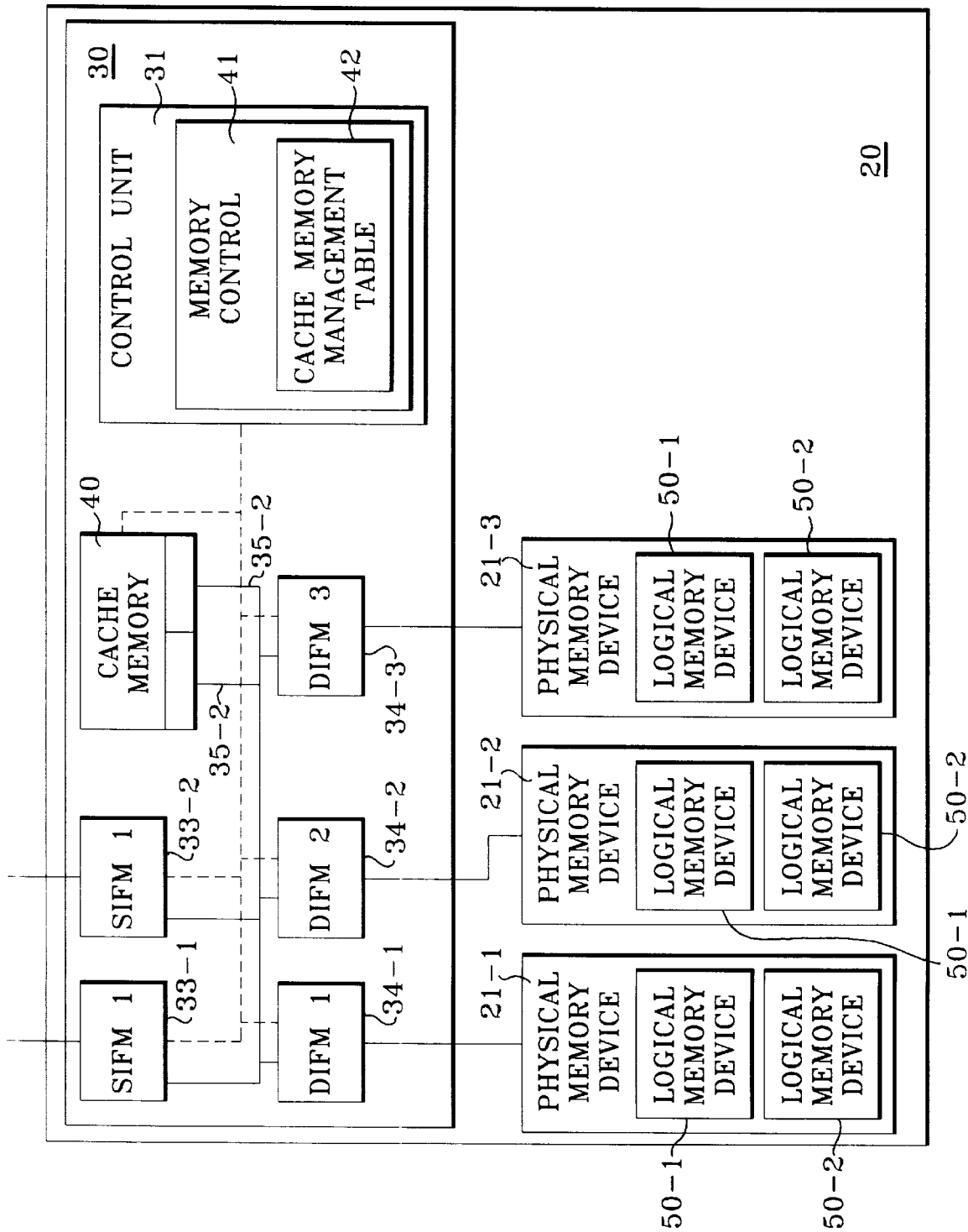
FIG. 10 is a block diagram of a prior art file control apparatus.
Figure 11:
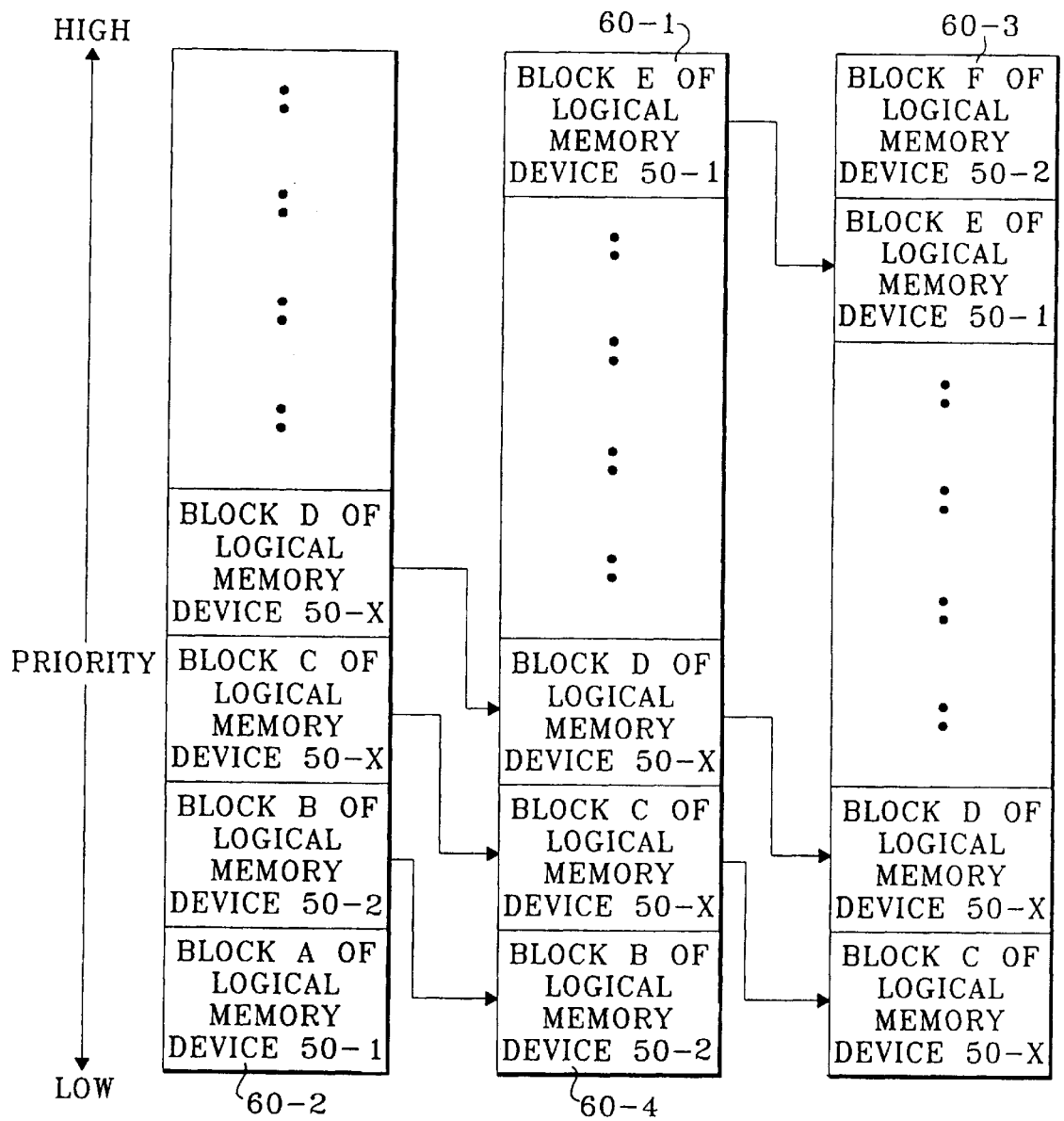
FIG. 11 shows the rule out or destaging process of a prior art file control apparatus.

Referring now to FIG. 9, an example is given of a situation where at least one of the blocks in a newly registered continuous data blocks is already registered in the continuous data information table 42-2. The columns in the upper half of FIG. 9 shows the status of the priority data information table 42-1 and those in the lower half shows the continuous data information table 42-2. The upper and the lower left most columns respectively shows the initial state of both the data priority information table 42-1 and the continuous data information table 42-2. The current lower left most column shows that blocks A–C of the memory device 3 are currently registered in the continuous data information table 42-2.

From this state, blocks C–E of the memory device 3 are updated as shown in the data priority information table 42-1 immediately to the right of the column showing the initial state. It is then determined that the block C of memory device 3 is included in the continuous data previously registered in the continuous data information table 42-2. As a result, block C is deleted from the previous set of continuous data blocks, and the newly updated set continuous data blocks, including block C is registered in the continuous data information table 42-2 after being removed from the data priority information table 42-1. The final state of the data priority information table 42-1 and the continuous data information table 42-2 are shown in the right most upper and the lower columns of FIG. 9.

In the examples described above, three data blocks were used to illustrate updating of continuous data. It should be understood, however, that continuous data information can be formed for any number of continuous data blocks. Once the continuous data information is registered, the control unit 31 stores the set of continuous blocks in the memory device 21 as one data unit when these blocks are destaged from the cache memory 40. For example, if one data block has a length of 4 kbytes, a data storing process can be completed with a single writing of data in the length of 12 kbytes. A group of data can be stored, for example, in the memory device with one SCSI command. In addition, destaging process control can more easily be realized by providing the continuous data information table 42-2 for each memory device 21.

In accordance with the file control apparatus of the present invention, positioning process such as arm operation of memory device can be minimized by storing data on the cache memory of the memory device according to the continuous data information. Moreover, at the time of staging, an overhead such as the change of sequence to store the data to the memory device by retrieving the data priority information is no longer required.

The present invention also provides the similar effect when RAID1 (multiplexing) is formed as the memory devices. For example, when one multiplexed memory device is considered, the operation is not different from the control of an ordinary physical disk in RAID1. Moreover, even when the RAID0 (striping) is formed, data can be recorded to the continuous area when considering one physical memory device. In addition, it is also possible to enjoy the merit that simultaneously write process can be done to all physical memory devices storing the discrete data. Regarding the RAID5 (striping with parity), since simultaneous write operations can be made to all physical memory device storing discrete data, read of parity before write operation is no longer required and it is also possible to expect the effect to reduce the number of times of access itself to the memory device.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. File control apparatus adapted to be operatively connected to a host device for controlling a plurality of memory devices, comprising:

a cache memory for storing data blocks sent to or retrieved from the memory devices by the host device through said file control apparatus;

control means for controlling data transfer between the memory devices and said cache memory; and continuous data information generating means for generating continuous data information indicating whether said data blocks stored in said cache memory are from a same one of the memory devices and updated continuously;

wherein said control means destages said data blocks updated continuously to said same one of the memory devices as a single data block.

2. The apparatus as defined in claim 1, further including a data priority information table for storing data priority information regarding destaging priority order of said data blocks stored in said cache memory.

3. The apparatus as defined in claim 2, further including a continuous data information table for storing said continuous data information, and wherein said data priority information of said data blocks determined to be stored consecutively in said cache memory are deleted from said data priority information table when said continuous data information is stored in said continuous data information table.

4. The apparatus as defined in claim 3 further including means for determining said destaging order between said data blocks having priority information stored in said data priority information table and said continuously updated data blocks having continuous data information stored in said continuous data information table.

5. The apparatus as defined in claim 3 wherein a data priority information entry is made in said data priority information table indicating said destaging order of said continuously updated data blocks as a single data block relative to other said data blocks stored in said cache memory, after said priority information of said data blocks determined to be updated continuously are deleted from said data priority information table.

6. The apparatus as defined in claim 3, wherein when said continuous data information of at least one of said data blocks determined to be updated continuously has been previously stored in said continuous data information table, said previously stored continuous data information is deleted from said continuous data information table.

7. The apparatus as defined in claim 2, wherein after said continuous data information generating means determines said continuously updated data blocks, priority information of all said consecutive data blocks are stored as a single priority information entry in said data priority information table.

8. The apparatus as defined in claim 2, wherein said data priority information is based on a least recently used (LRU) system.

9. Method for controlling transfer of data from a cache memory of a file control apparatus to a plurality of memory devices, said method comprising the steps of:

registering data priority information on a data priority information table indicating a destaging priority order for each data block from the memory devices updated in a cache memory of the file control apparatus;

registering continuous data information on a continuous data information table from said data priority information indicating said data blocks which are from a same one of the memory devices and updated continuously in said cache memory; and destaging said continuously updated data blocks to said same one of the memory devices as a single data block.

10. The method as defined in claim 9, further including the step of removing said data priority information corresponding to said continuously updated data blocks from said data priority information table after said continuous data information is registered in said continuous data information table.

11. The method as defined in claim 10, further including the step of determining a destaging priority between said data blocks having destaging order registered in said data priority information table and said continuously updated data blocks registered in said continuous data information table.

12. The method as defined in claim 10, further including the step of registering in said data priority information table a single entry for said continuously updated data blocks, after said data priority information corresponding to said individual data blocks determined to be updated continuously are removed from said data priority information table.

13. The method as defined in claim 10, further including the step of deleting from said continuous data information table said continuous data information of at least one of said continuously updated data blocks previously registered in said continuous data information table when said one of said continuously updated data blocks previously registered is the same data block of a newly consecutively updated data block.

14. The method as defined in claim 10, wherein said data priority information is based on least recently used (LRU) system.

15. Method for controlling transfer of data from a cache memory of a file control apparatus to a plurality of memory devices, said method comprising the steps of:

registering data priority information on a data priority information table indicating a destaging priority for each data block from the memory devices updated in a cache memory of the file control apparatus;

determining continuous data information from said data priority information indicating said data blocks which are from a same one of the memory devices and updated continuously in said cache memory;

registering data said continuously updated data blocks as a single block in said data priority information table; and storing said continuously updated data blocks in said same one of the memory devices as a single data block in accordance with said destaging priority.

* * * * *